March 3, 1964

B. S. STAWINSKI 3,122,804

MOLDING FASTENER

Filed Oct. 18, 1962

INVENTOR.
Benjamin S. Stawinski
BY
George A. Schmidt
ATTORNEY

United States Patent Office 3,122,804
Patented Mar. 3, 1964

3,122,804
MOLDING FASTENER
Benjamin S. Stawinski, Southfield, Mich., assignor to General Motors Corporation, Detroit, Mich., a corporation of Delaware
Filed Oct. 18, 1962, Ser. No. 231,463
2 Claims. (Cl. 24—73)

This invention relates to molding fasteners, and more particularly to an adjustable fastener for securing an ornamental molding strip to a support.

In the design and manufacture of many structures, such as automobiles, it is often necessary or desirable to secure an ornamental molding strip along the surfaces of the body panels in order to cover seams and joints, or for purely aethestic reasons. Generally, in the manufacturing process the vehicle body panel is suitably punched to provide a series of apertures in the area where the molding strip is to be mounted prior to its assembly with the remaining parts of the vehicle. It is possible for the apertures to be slightly misaligned or for the panel itself to be misaligned upon assembly so that the molding strip is secured with extreme difficulty when using fastening devices generally available. When misalignment occurs, either the hole must be repunched, a new hole must be punched, or a different fastening device must be used in order to properly align the molding strip with respect to the supporting panel and with respect to other body panels. This is an extremely time consuming and inefficient operation, and it is costly to the manufacturer.

The device in which this invention is embodied comprises, generally a one-piece plastic fastening device including a body portion and a stud portion connected by an integral resilient strap. The body portion is provided with an opening which is larger than the aperture in the body panel, and the stud portion is provided with an enlarged clamping head which is greater in one dimension than the opening in the body portion and less in the other dimension to permit the body portion to be adjusted on the support relative to the stud portion. This permits adjustment of the fastening device to compensate for the misalignment of the aperture in the support or to compensate for misalignment of the supporting panel itself.

Thus, a single fastening device may be used in any situation for securing the molding strip to the supporting panel, avoiding the expensive and time consuming misalignment problems and providing proper molding strip placement.

These and other advantages will become more apparent from the description and drawing, in which:

FIGURE 1 is a partial view of a motor vehicle illustrating the use of ornamental molding strips;

FIGURE 2 is an enlarged view of a molding strip of FIGURE 1, with parts broken away and in section to illustrate the operability of the fastening device;

FIGURE 3 is a cross-sectional view of the molding strip installation illustrated in FIGURE 2, taken substantially along the line 3—3 of FIGURE 2 and looking in the direction of the arrows;

FIGURE 4 is a cross-sectional view of the molding strip installation illustrated in FIGURE 2, taken substantially along the line 4—4 of FIGURE 2 and looking in the direction of the arrows; and FIGURE 5 is a perspective view of the fastening device illustrated in FIGURES 2–4.

Referring more particularly to the drawing, FIGURE 1 illustrates a typical structure, such as automobile 10, which is provided with ornamental molding strips 12. The vehicle 10 has a fender panel 14, a front door panel 16 and a rear door panel 18 which are provided with ornamental molding strips 12. It is desired that the molding strips be aligned along the length of the car. In FIGURE 1 a misaligned molding strip is indicated in dashed and dotted lines on the front door panel 16, showing how the misalignment of the apertures in the supporting panels or misalignment of the panel itself can disrupt the smooth line of the molding strips.

FIGURES 2–4 illustrate how the molding strip 12 is secured to the body panels 16 and 18. The molding strip 12 may be of generally C-shaped cross-section having inturned flanges 20 formed along the edges thereof. The plastic molding fastener, illustrated generally by the numeral 22, is provided to secure the molding strip 12 in place. The supporting panels, such as panel 18, are provided with a series of apertures 24 which may be of any suitable configuration. The specific form of aperture 24 depends on the shape of the fastening device as will become hereinafter more apparent.

Fastening device 22 may be formed of a plastic material having a degree of resilience permitting insertion in the panel. The term "plastic material" is used to distinguish over a metal fastener which would not be suitable in the installation described. The metallic fastener often chips or scratches the paint surface, providing a starting point for rust and corrosion, and further requires hand or mechanical tools to insert the fastening device in the supporting panel. The device illustrated and described is of a plastic material, such as nylon or polyethylene, and of sufficient rigidity to maintain the molding strip against the supporting panel. The fastening device 22 includes a body portion 26, a stud portion 28, and a connecting strap 30. Body portion 26 is provided with outwardly disposed edges or flanges 32 which extend between and overlap the flanges 20 on the molding strip 12 so that when the body portion 26 is secured to the support panel 18 the molding fastener may be securely held in place. Body portion 26 is provided with an opening 34 which may be generally rectangular in shape and which is larger in size than the aperture 24 formed in the supporting panel 18. The edges 36 and 38 of the opening 34 are angularly disposed relative to the surfaces of the body portion 26. The purpose for the angular disposition will become hereinafter more apparent.

Stud portion 28 is provided with an elongated shank 40 which is of generally the same cross-sectional configuration as the shape of the aperture 24 in the support 18. Shank 40 is provided with a groove 42 which is substantially the same size as the aperture 24 in the support 18, and which is smaller than the remainder of the shank 40 so that the shank may be forced into the aperture 24 to first contract and then expand as the groove 42 comes in registry with the aperture 24. This securely holds the stud portion 28 in the support panel 18.

Stud portion 28 is also provided with an enlarged head 44 which may be of a generally rectangular shape or of a shape somewhat similar to the opening 34 in the body portion 36. The head 44 has one dimension, such as the lateral dimension, slightly greater than opening 34 and another dimension, such as the vertical dimension in the drawing, which is less than the vertical dimension of the opening 34. This permits the body portion to be adjusted to a great number of positions relative to the stud portion when installed to compensate for misalignment in the body panel apertures or in the body panel mounting. Head 44 is provided with inclined shoulders 46 and 48 on the ends having the greater dimension which serve to engage the inclined edges 36 and 38 of the opening 34 in the body portion 26. This permits secure clamping engagement of the stud portion 28 against the body portion 26 on assembly.

When assembling the fastening device, the body portion 26 is placed over the supporting panel 18 and in registry with the aperture 24 therein. The body portion is located relative to the aperture 28 so that the molding strip 12 will be properly aligned with the remaining parts of the overall assembly. The stud portion is placed through the opening 34 and pushed into the aperture 24 in the support 18 so that the groove 42 receives the supporting panel 18 at the aperture 24. The inclined surfaces 46 and 48 of the head 44 engage the inclined edges 36, 38 of the opening 34, and the fastening device is securely retained in the supporting panel. The molding strip 12 is then snapped over the flanges or outwardly directed edges 32 for retention against the supporting panel. If it should become obvious that the fastening device is not properly aligned or that upon installation of the molding strip, the molding strip will be misaligned, adjustment may be made in the position of the body portion relative to the support panel 18 and to the stud portion 28 by lightly tapping or otherwise sliding the body portion beneath the head 44. It is necessary that some amount of force be used so that normal operation of the vehicle or bumping of the molding strip will not cause the body portion 26 to slip beneath the stud portion 28 and cause unexpected misalignment.

FIGURE 2 illustrates the fastening device 22 in two different positions adjacent the supporting panel 18. The right-hand portion of FIGURE 2 shows the molding strip fastener properly aligned relative to the supporting panel, which means that the aperture 24 formed in the supporting panel is properly placed. Viewing the left-hand side of FIGURE 2, it is apparent that either the aperture 24 in the support 16 is too low or that the entire supporting panel 16 is assembled too low relative to the remaining panels so that the aperture in support 16 does not line up with the aperture in support 18. As noted in FIGURE 2, the body portion 26 of the left-hand installation is aligned with the body portion 26 of the right-hand installation. However, the stud portion 28 of the left-hand installation is below the stud portion location in the right-hand installaiton. This is possible because the opening 34 in the body portion 36 is of sufficient size to permit the re-alignment of the fastening devices.

Thus, a fastening device is provided which is universal in its application to retain molding strips or other ornamental devices to supporting panels. The misalignment problem need not be considered since the molding strip is adjustable to any of a number of positions to compensate for misalignment. The use of the fastening device presents a more efficient and inexpensive assembly procedure for securing ornamental strips to the supporting panels.

What is claimed is:

1. A fastening device for securing a molding strip having inturned flanges along the edges thereof to a support having an aperture therein and comprising:

a generally planar body portion adapted to overlie said support; opposite edges of said body portion being angularly outwardly directed for engaging the flanges of said molding strip, said body portion having an opening therein of a size larger than the aperture in said support and the edges of said opening being angularly formed with respect to the remainder of said body portion;

a stud portion adapted to pass through said opening in said body portion and into said aperture in said support for clamping said body portion against said support, said stud portion having a head greater in one dimension and lesser in another dimension than said aperture in said body portion with inclined shoulders on the sides of said stud portion of lesser dimension to engage said inclined edges of said aperture in said body portion and clamp said body portion against said support in any of several positions relative to said support and said stud portion;

and a resilient strap integral with said body portion and integral with said stud portion to connect said portions and form a one-piece fastener.

2. A fastening device for securing a molding strip having inturned flanges along the edges thereof to a support having an aperture therein and comprising:

a generally planar body portion adapted to overlie said support and having a generally rectangular opening formed therein, said opening being larger than the aperture in said support to permit alignment of said opening and said aperture in a number of positions of said body portion relative to said support, said opening having edges forming an angle with the surfaces of said body portion, said body portion having edges angularly outwardly disposed for engaging the flanges of said molding strip;

a stud portion having a generally rectangular head and a shank, said shank being receivable in said aperture in said support through said opening in said body portion, said head being greater in one dimension than said opening in said body portion and less in the other dimension than said opening to permit said body portion to assume a number of positions on said body portion relative to said support and to said stud portion, said head having angularly inclined shoulders thereon to engage said angular edges of said opening to clamp said body portion against said support;

and a resilient connecting strap inegral with said body portion and integral with said stud portion to connect said portions and form a one-piece fastener.

References Cited in the file of this patent
UNITED STATES PATENTS
2,846,743     Patton _____ Aug. 12, 1958
FOREIGN PATENTS
1,205,039     France _____ Aug. 10, 1959